United States Patent
Jiang et al.

(10) Patent No.: US 12,167,373 B2
(45) Date of Patent: Dec. 10, 2024

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 354 days.

(21) Appl. No.: 17/735,134

(22) Filed: May 3, 2022

(65) Prior Publication Data
US 2022/0264538 A1    Aug. 18, 2022

Related U.S. Application Data

(63) Continuation of application No. PCT/CN2020/121368, filed on Oct. 16, 2020.

(30) Foreign Application Priority Data

Nov. 14, 2019    (CN) .......................... 201911115433.0

(51) Int. Cl.
*H04W 4/00*    (2018.01)
*H04L 1/1812*    (2023.01)
(Continued)

(52) U.S. Cl.
CPC ........... *H04W 72/02* (2013.01); *H04L 1/1812* (2013.01); *H04L 5/0053* (2013.01); *H04W 72/0446* (2013.01); *H04W 72/0453* (2013.01)

(58) Field of Classification Search
CPC ............. H04W 72/02; H04W 72/0446; H04W 72/0453; H04L 5/0053; H04L 1/1812
See application file for complete search history.

(56) References Cited

U.S. PATENT DOCUMENTS

2017/0094656 A1*    3/2017  Chen ...................... H04W 76/14
2018/0302197 A1*    10/2018 He ............................ H04L 5/14
(Continued)

FOREIGN PATENT DOCUMENTS

| CN | 107404369 A | 11/2017 |
| CN | 110266450 A | 9/2019 |

(Continued)

OTHER PUBLICATIONS

English Translation of the Written Opinion of the International Searching Authority, WIPO, May 17, 2022, pp. 1-5. (Year: 2022).*
(Continued)

*Primary Examiner* — Elisabeth Benoit Magloire

(57) ABSTRACT

The present disclosure provides a method and device in a node used for wireless communications. A first node first receives a first signaling, receives a first signal in a first time-frequency resource set, and the first time-frequency resource set belongs to a first time-frequency resource pool; then transmits a first information set in a target time-frequency resource set; the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool. The application improves the transmission efficiency of the sidelink feedback channel to improve the spectrum efficiency on sidelink.

18 Claims, 5 Drawing Sheets

(51) Int. Cl.
  *H04L 5/00* (2006.01)
  *H04W 72/02* (2009.01)
  *H04W 72/0446* (2023.01)
  *H04W 72/0453* (2023.01)

(56) References Cited

U.S. PATENT DOCUMENTS

| | | | |
|---|---|---|---|
| 2019/0052436 A1* | 2/2019 | Desai | H04W 72/0446 |
| 2019/0097751 A1* | 3/2019 | Li | H04W 4/027 |
| 2019/0380136 A1* | 12/2019 | Zhang | H04L 1/08 |
| 2020/0053699 A1* | 2/2020 | Chen | H04W 72/02 |
| 2020/0146070 A1* | 5/2020 | Xiong | H04W 76/27 |
| 2020/0267729 A1* | 8/2020 | Kim | H04W 72/20 |
| 2020/0344810 A1* | 10/2020 | Xiong | H04W 74/0833 |
| 2020/0351853 A1* | 11/2020 | Xiong | H04L 5/0048 |
| 2021/0274568 A1* | 9/2021 | Sengupta | H04W 76/11 |
| 2021/0297221 A1* | 9/2021 | Lee | H04L 5/0053 |

FOREIGN PATENT DOCUMENTS

| | | |
|---|---|---|
| CN | 110311762 A | 10/2019 |
| WO | 2019098896 A1 | 5/2019 |
| WO | 2019139513 A1 | 7/2019 |
| WO | 2019195505 A1 | 10/2019 |

OTHER PUBLICATIONS

ISR received in application No. PCT/CN2020/121368 dated Jan. 6, 2021.
First Office Action of Chinses patent application No. CN201911115433.0 dated Oct. 15, 2021.
First Search Report of Chinses patent application No. CN201911115433.0 dated Oct. 11, 2021.
Notification to Grant Patent Right for Invention of Chinses patent application No. CN201911115433.0 dated Jan. 26, 2022.
Huawei, HiSilicon Sidelink resource allocation mode 1 3GPP TSG RAN WG1 Meeting #98bis R1-1910055 Oct. 20, 2019.

* cited by examiner

METHOD AND DEVICE IN NODES USED FOR WIRELESS COMMUNICATION

CROSS REFERENCE TO RELATED APPLICATIONS

This application is a continuation of International Patent application No. PCT/CN2020/121368, filed on Oct. 16, 2020, which claims the priority benefit of Chinese Patent Application No. 201911115433.0 filed on Nov. 14, 2019, the full disclosure of which is incorporated herein by reference.

BACKGROUND

Technical Field

The present disclosure relates to transmission methods and devices in wireless communication systems, and in particular to a sidelink-related transmission method and device in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP defines 4 major Use Case Groups, Vehicles Platooning, Extended Sensors, Advanced Driving and Remote Driving. At 3GPP RAN #80 plenary, the NR-based V2X technology research has been started, and based on the current discussion, a plurality of transmission types including broadcast, groupcast and unicast are supported on sidelink.

SUMMARY

Compared with the existing Long-term Evolution (LTE) V2X system, a significant feature of NR V2X is that it supports unicast and groupcast and supports Hybrid Automatic Repeat reQuest (HARQ) function. A Physical Sidelink Feedback Channel (PSFCH) channel is introduced for HARQ-Acknowledgement (HARQ-ACK) transmission on sidelink. In the current NR-based V2X of Rel-16 release, the mainstream view on the PSFCH is that the PSFCH is generated through sequence and carries a maximum number of 2 information bits to reduce the design complexity of the PSFCH. Meanwhile, an association method indicated by a non-dynamic signaling is tend to be adopted between a Physical Sidelink Shared Channel (PSSCH) and a PSFCH occupied by its corresponding feedback information, so as to simplify the design of Sidelink Control Information (SCI) and facilitate the design of channel sensing. In V2X of the future Rel-17 release, the PSFCH will carry more information bits, and the configuration and design scheme of the corresponding PSFCH need to be reconsidered.

To address the above problem, the present disclosure provides a solution. It should be noted that in the description of the above problems, V2X is only an application scenario example of the scheme provided in the present disclosure; the present disclosure is also applicable to scenarios such as cellular networks and satellite communications, where similar technical effects can be achieved. Similarly, the present disclosure is also applicable to scenarios where a feedback channel supports a plurality of transmission formats and transmission methods, so as to achieve similar technical effects. Additionally, the adoption of a unified solution for various scenarios, including but not limited to V2X and non-V2X scenarios, contributes to the reduction of hardcore complexity and costs.

Further, it should be noted that the embodiments of a first node in the present disclosure and the characteristics of the embodiments may be applied to a second node or a third node if no conflict is incurred. Conversely, the embodiments of a second node and characteristics of the embodiments in the present disclosure can be applied to a first node; and the embodiments of a third node and characteristics of the embodiments in the present disclosure can be applied to a first node; and the embodiments in the present disclosure and the characteristics in the embodiments can be arbitrarily combined if there is no conflict.

The present disclosure provides a method in a first node for wireless communications, comprising:

receiving a first signaling, receiving a first signal in a first time-frequency resource set, the first time-frequency resource set belonging to a first time-frequency resource pool; and transmitting a first information set in a target time-frequency resource set;

herein, the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, advantages of the above method include: the second time-frequency resource set and the third time-frequency resource set are reserved at the same time for a transmission of a PSFCH corresponding to a PSSCH on sidelink, the second time-frequency resource set corresponds to non-multiplexed scenarios to ensure the compatibility with the existing version of UE, and the third time-frequency resource set corresponds to multiplexing scenarios to ensure that users of subsequent new enhanced version can enhance the spectrum efficiency of the PSFCH through multiplexing.

In one embodiment, advantages of the above method include: a dynamic switching between the second time-frequency resource set and the third time-frequency resource set is realized through the first field in the first signaling, so as to ensure the flexibility of the implementation of the method in the present disclosure.

According to one aspect of the present disclosure, the above method is characterized in that the target time-frequency resource set is unrelated to a number of bit block(s) detected by the first node in the first time-frequency resource pool, and the bit block comprises information bits and cyclic redundancy check bits.

According to one aspect of the present disclosure, the above method is characterized in that the first field in the first signaling reuses a field in an SCI format supported by a legal terminal for indicating HARQ feedback selection 1 or HARQ feedback selection 2, the HARQ feedback selection 1 is to only feed back a NACK, and the HARQ feedback selection 2 is to feed back both an ACK and a NACK.

In one embodiment, advantages of the above method include: by reusing a HARQ feedback indication field in an SCI, it facilitates the implementation without increasing the payload of SCI.

According to one aspect of the present disclosure, the above method is characterized in comprising:

receiving a second signaling;

herein, the first field in the first signaling reuses a field in an SCI format supported by a legal terminal for indicating whether a HARQ-ACK for the first signal is used; the second signaling indicates that the field in the first signaling is reinterpreted as: when the first field in the first signaling indicates that a HARQ-ACK for the first signal is used, the target time-frequency resource set is the second time-frequency resource set, and when the first field in the first signaling indicates that a HARQ-ACK for the first signal is not used, the target time-frequency resource set is the third time-frequency resource set.

In one embodiment, advantages of the above method include: whether the first field can be re-interpreted is indicated through the second signaling, which enables the implementation way in the method proposed in the present disclosure more flexible, so as to reduce unnecessary impact on the existing standards.

According to one aspect of the present disclosure, the above method is characterized in comprising:

receiving a third signaling;

herein, the third signaling indicates that the first time-frequency resource pool is associated with the third time-frequency resource set.

According to one aspect of the present disclosure, the above method is characterized in that the first information set adopts different transmission methods respectively in the second time-frequency resource set and the third time-frequency resource set.

In one embodiment, advantages of the above method include: a PSFCH in the second time-frequency resource set adopts a non-multiplexing method to ensure the compatibility with the existing terminals, and a PSFCH in the third time-frequency resource set adopts a multiplexing method to improve the spectrum efficiency of the PSFCH transmission.

In one embodiment, another advantage of the above method includes: time-frequency resources occupied by the second time-frequency resource set and time-frequency resources occupied by the third time-frequency resource set can be partially or completely overlapped, so as to ensure that the PSFCH does not occupy too much spectrum resources of the system, thus improving the transmission efficiency.

According to one aspect of the present disclosure, the above method is characterized in that the first time-frequency resource pool comprises K1 first-type time-frequency resource sets, the first time-frequency resource set is one of the K1 first-type time-frequency resource sets, and a location of the first time-frequency resource set in the first-type time-frequency resource set is used to determine whether the third time-frequency resource set carries the first information set.

According to one aspect of the present disclosure, the above method is characterized in that the first time-frequency resource pool comprises K1 first-type time-frequency resource sets, the first time-frequency resource set is one of the K1 first-type time-frequency resource sets, and the first information set is associated with the K1 first-type time-frequency resource sets; the first signaling comprises a third field, a transmitter of the first signaling occupies K2 first-type time-frequency resource set(s) in the K1 first-type time-frequency resource sets for a transmission to the first node, and the third field is used to indicate a location of the first time-frequency resource set in the K2 first-type time-frequency resource set(s); K2 is a positive integer not greater than K1.

In one embodiment, advantages of the above method include: by introducing the third field, when a plurality of time-frequency resource sets in the first time-frequency resource pool are scheduled to the first node, an introduction of the third field can solve the problem of there existing one of a plurality of SCIs corresponding to the plurality of time-frequency resource sets missed to be detected by the first node, so as to improve the overall performance.

The present disclosure provides a method in a second node for wireless communications, comprising:

transmitting a first signaling, transmitting a first signal in a first time-frequency resource set, the first time-frequency resource set belonging to a first time-frequency resource pool; and receiving a first information set in a target time-frequency resource set;

herein, the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

According to one aspect of the present disclosure, the above method is characterized in that the target time-frequency resource set is unrelated to a number of bit block(s) detected by the first node in the first time-frequency resource pool, and the bit block comprises information bits and cyclic redundancy check bits.

According to one aspect of the present disclosure, the above method is characterized in that the first field in the first signaling reuses a field in an SCI format supported by a legal terminal for indicating HARQ feedback selection 1 or HARQ feedback selection 2, the HARQ feedback selection 1 is to only feed back a NACK, and the HARQ feedback selection 2 is to feed back both an ACK and a NACK.

According to one aspect of the present disclosure, the above method is characterized in comprising:

receiving a second signaling;

herein, the first field in the first signaling reuses a field in an SCI format supported by a legal terminal for indicating whether a HARQ-ACK for the first signal is used; the second signaling indicates that the field in the first signaling is reinterpreted as: when the first field in the first signaling indicates that a HARQ-ACK for the first signal is used, the target time-frequency resource set is the second time-frequency resource set, and when the first field in the first signaling indicates that a HARQ-ACK for the first signal is not used, the target time-frequency resource set is the third time-frequency resource set.

According to one aspect of the present disclosure, the above method is characterized in comprising:

transmitting a second signaling;

herein, the first field in the first signaling reuses a field in an SCI format supported by a legal terminal for indicating whether a HARQ-ACK for the first signal is used; the second signaling indicates that the field in the first signaling is reinterpreted as: when the first field in the first signaling indicates that a HARQ-ACK for the first signal is used, the target time-frequency resource set is the second time-frequency resource set, and when the first field in the first signaling indicates that a HARQ-ACK for the first signal is not used, the target time-frequency resource set is the third time-frequency resource set.

According to one aspect of the present disclosure, the above method is characterized in comprising:

receiving a third signaling;

herein, the third signaling indicates that the first time-frequency resource pool is associated with the third time-frequency resource set.

According to one aspect of the present disclosure, the above method is characterized in comprising:

transmitting a third signaling;

herein, the third signaling indicates that the first time-frequency resource pool is associated with the third time-frequency resource set.

According to one aspect of the present disclosure, the above method is characterized in that the first information set adopts different transmission methods respectively in the second time-frequency resource set and the third time-frequency resource set.

According to one aspect of the present disclosure, the above method is characterized in that the first time-frequency resource pool comprises K1 first-type time-frequency resource sets, the first time-frequency resource set is one of the K1 first-type time-frequency resource sets, and a location of the first time-frequency resource set in the first-type time-frequency resource set is used to determine whether the third time-frequency resource set carries the first information set.

According to one aspect of the present disclosure, the above method is characterized in that the first time-frequency resource pool comprises K1 first-type time-frequency resource sets, the first time-frequency resource set is one of the K1 first-type time-frequency resource sets, and the first information set is associated with the K1 first-type time-frequency resource sets; the first signaling comprises a third field, a transmitter of the first signaling occupies K2 first-type time-frequency resource set(s) in the K1 first-type time-frequency resource sets for a transmission to the first node, and the third field is used to indicate a location of the first time-frequency resource set in the K2 first-type time-frequency resource set(s); K2 is a positive integer not greater than K1.

According to one aspect of the present disclosure, the above method is characterized in comprising:

performing monitoring in K3 first-type time-frequency resource set(s);

herein, the first time-frequency resource pool comprises K1 first-type time-frequency resource sets, any of the K3 first-type time-frequency resource set(s) belongs to the first time-frequency resource pool and is located before the first time-frequency resource set in time domain, and a result of the monitoring is used to determine whether the first field indicates that the target time-frequency resource set is the third time-frequency resource set; K3 is a positive integer less than K1.

The present disclosure provides a method in a third node for wireless communications, comprising:

transmitting a second signaling;

herein, a first field in a first signaling reuses a field in an SCI format supported by a legal terminal for indicating whether a HARQ-ACK for a first signal is used; the second signaling indicates that the field in the first signaling is reinterpreted as: when the first field in the first signaling indicates that a HARQ-ACK for the first signal is used, a target time-frequency resource set is a second time-frequency resource set, and when the first field in the first signaling indicates that a HARQ-ACK for the first signal is not used, a target time-frequency resource set is a third time-frequency resource set; a receiver of the second signaling comprises a first node, the first node receives the first signaling, receives a first signal in a first time-frequency resource set, and transmits a first information set in the target time-frequency resource set; the first time-frequency resource set belongs to a first time-frequency resource pool; the first signaling comprises the first field, the target time-frequency resource set is one of the second time-frequency resource set and the third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

According to one aspect of the present disclosure, the above method is characterized in that the target time-frequency resource set is unrelated to a number of bit block(s) detected by the first node in the first time-frequency resource pool, and the bit block comprises information bits and cyclic redundancy check bits.

According to one aspect of the present disclosure, the above method is characterized in that the first field in the first signaling reuses a field in an SCI format supported by a legal terminal for indicating HARQ feedback selection 1 or HARQ feedback selection 2, the HARQ feedback selection 1 is to only feed back a NACK, and the HARQ feedback selection 2 is to feed back both an ACK and a NACK.

According to one aspect of the present disclosure, the above method is characterized in comprising:

transmitting a third signaling;

herein, the third signaling indicates that the first time-frequency resource pool is associated with the third time-frequency resource set.

According to one aspect of the present disclosure, the above method is characterized in that the first information set adopts different transmission methods respectively in the second time-frequency resource set and the third time-frequency resource set.

According to one aspect of the present disclosure, the above method is characterized in that the first time-frequency resource pool comprises K1 first-type time-frequency resource sets, the first time-frequency resource set is one of the K1 first-type time-frequency resource sets, and a location of the first time-frequency resource set in the first-type time-frequency resource set is used to determine whether the third time-frequency resource set carries the first information set.

According to one aspect of the present disclosure, the above method is characterized in that the first time-frequency resource pool comprises K1 first-type time-frequency resource sets, the first time-frequency resource set is one of the K1 first-type time-frequency resource sets, and the first information set is associated with the K1 first-type time-frequency resource sets; the first signaling comprises a third field, a transmitter of the first signaling occupies K2 first-type time-frequency resource set(s) in the K1 first-type time-frequency resource sets for a transmission to the first node, and the third field is used to indicate a location of the first time-frequency resource set in the K2 first-type time-frequency resource set(s); K2 is a positive integer not greater than K1.

The present disclosure provides a first node for wireless communications, comprising:

a first receiver, receiving a first signaling, receiving a first signal in a first time-frequency resource set, the first time-frequency resource set belonging to a first time-frequency resource pool; and a first transmitter, transmitting a first information set in a target time-frequency resource set;

herein, the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

The present disclosure provides a second node for wireless communications, comprising:

a second transmitter, transmitting a first signaling, transmitting a first signal in a first time-frequency resource set, the first time-frequency resource set belonging to a first time-frequency resource pool; and a second receiver, receiving a first information set in a target time-frequency resource set;

herein, the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

The present disclosure provides a third node for wireless communications, comprising:

a third transmitter, transmitting second signaling;

herein, a first field in a first signaling reuses a field in an SCI format supported by a legal terminal for indicating whether a HARQ-ACK for a first signal is used; the second signaling indicates that the field in the first signaling is reinterpreted as: when the first field in the first signaling indicates that a HARQ-ACK for the first signal is used, a target time-frequency resource set is a second time-frequency resource set, and when the first field in the first signaling indicates that a HARQ-ACK for the first signal is not used, a target time-frequency resource set is a third time-frequency resource set; a receiver of the second signaling comprises a first node, the first node receives the first signaling, receives a first signal in a first time-frequency resource set, and transmits a first information set in the target time-frequency resource set; the first time-frequency resource set belongs to a first time-frequency resource pool; the first signaling comprises the first field, the target time-frequency resource set is one of the second time-frequency resource set and the third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, the present disclosure has the following advantages over conventional schemes:

the second time-frequency resource set and the third time-frequency resource set are reserved at the same time for a transmission of a PSFCH corresponding to a PSSCH on sidelink, the second time-frequency resource set corresponds to non-multiplexed scenarios to ensure the compatibility with the existing version of UE, and the third time-frequency resource set corresponds to multiplexing scenarios to ensure that users of subsequent new enhanced version can enhance the spectrum efficiency of the PSFCH through multiplexing;

a dynamic switching between the second time-frequency resource set and the third time-frequency resource set is realized through the first field in the first signaling, so as to ensure the flexibility of the implementation of the method in the present disclosure;

by reusing a HARQ feedback indication field in an SCI, it facilitates the implementation without increasing the payload of SCI;

whether the first field can be re-interpreted is indicated through the second signaling, which enables that the implementation way in the method proposed in the present disclosure more flexible, so as to reduce the unnecessary impact on the existing standards.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
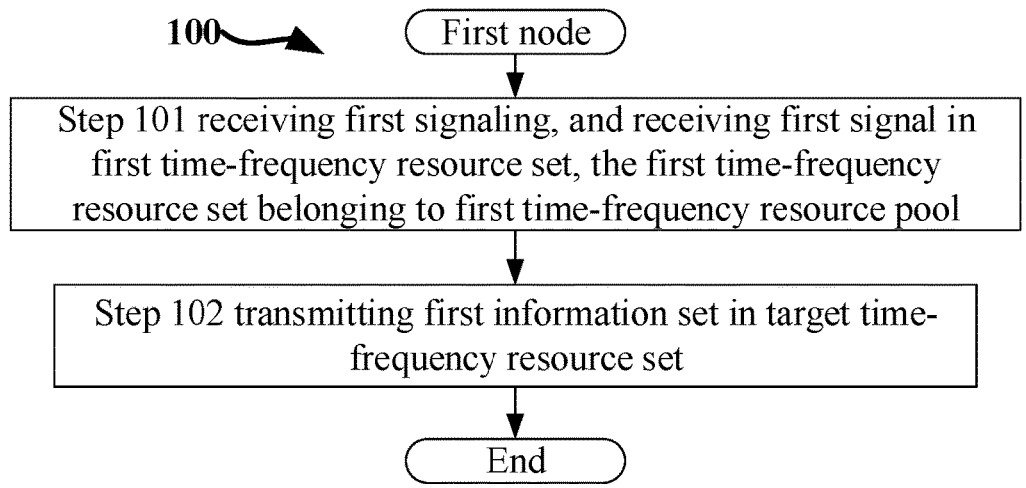
FIG. 1 illustrates a flowchart of the processing of a first node according to one embodiment of the present disclosure.

Embodiment 1 illustrates a processing flowchart of a first node, as shown in FIG. 1. In 100 illustrated by FIG. 1, each box represents a step. In embodiment 1, a first node in the present disclosure receives a first signaling in step 101 and receives a first signal in a first time-frequency resource set, and the first time-frequency resource set belongs to a first time-frequency resource pool; transmits a first information set in a target time-frequency resource set in step 102.

In embodiment 1, the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical layer signaling.

In one embodiment, the first signaling is an SCI.

In one embodiment, the first signaling is specific to the first node.

In one embodiment, a Cyclic Redundancy Check (CRC) comprised in the first signaling is scrambled through an identity (ID) specific to the first node.

In one embodiment, a physical layer channel carrying the first signaling is a Physical Sidelink Control Channel (PSCCG).

In one embodiment, the first signaling comprises an SCI for scheduling the first signal.

In one embodiment, the first signaling is used to indicate a location of frequency-domain resources occupied by the first time-frequency resource set.

In one embodiment, the first signaling is used to indicate a location of time-domain resources occupied by the first time-frequency resource set.

In one embodiment, the first signaling comprises two SCIs, and the two SCIs are respectively a 1st stage SCI and a 2nd stage SCI.

In one subembodiment of the embodiment, the 2nd stage SCI comprises the first field.

In one embodiment, the first signaling comprises an SCI.

In one subembodiment of the embodiment, the one SCI is a 2nd stage SCI.

In one embodiment, the first signaling is a 2nd stage SCI.

In one embodiment, the first field in the first signaling consists of 1 bit.

In one embodiment, the first field in the first signaling consists of 2 bits.

In one embodiment, the first signaling is used to indicate that the second time-frequency resource set is the target time-frequency resource set.

In one embodiment, the first signaling is used to indicate that the third time-frequency resource set is the target time-frequency resource set.

In one embodiment, the first information set is a HARQ-ACK for the first signal.

In one embodiment, the first information set is a HARQ feedback for the first signal.

In one embodiment, the first information set is a HARQ-NACK for the first signal.

In one embodiment, the first information set comprises one bit.

In one embodiment, the first information set comprises a plurality of bits.

In one embodiment, the first information set comprises one characteristic sequence.

In one embodiment, the first signal is generated by a Transmission Block (TB).

In one embodiment, a physical layer channel carrying the first signal is a PSSCH.

In one embodiment, a transmission channel carrying the first signal is a Sidelink Shared Channel (SL-SCH).

In one embodiment, the second time-frequency resource set is only reserved for a transmission of the first information set.

In one embodiment, the third time-frequency resource set is reserved for a transmission of K1 information sets, and the first information set is one of the K1 information sets, K1 being a positive integer greater than 1.

In one subembodiment of the embodiment, the K1 information sets are respectively used to feed back whether K1 first-type signals are correctly received, the K1 first-type signals are respectively transmitted in K1 first-type time-frequency resource sets, the first time-frequency resource pool comprises the K1 first-type time-frequency resource sets, and the first time-frequency resource set is one of the K1 first-type time-frequency resource sets corresponding to the first information set.

In one subembodiment of the embodiment, the K1 information sets are respectively used to feed back whether K1 first-type signals are correctly received, and a physical layer channel carrying any of the K1 first-type signals is a PSSCH.

In one subembodiment of the embodiment, the K1 information sets are respectively used to feed back whether K1 first-type signals are correctly received, and a transmission channel carrying any of the K1 first-type signals is an SL-SCH.

In one embodiment, the first time-frequency resource pool occupies a plurality of slots in time domain, and the first time-frequency resource set occupies one of the plurality of slots in time domain.

In one embodiment, the first time-frequency resource pool comprises K1 first-type time-frequency resource sets, the K1 first-type time-frequency resource sets respectively occupy K1 orthogonal slots, and the first time-frequency resource set occupies one of the K1 orthogonal slots.

In one embodiment, the above phrase of the second time-frequency resource set being related to a location of the first time-frequency resource set in the first time-frequency resource pool includes: the second time-frequency resource set is related to a time-domain location of the first time-frequency resource set.

In one embodiment, the above phrase of the second time-frequency resource set being related to a location of the first time-frequency resource set in the first time-frequency resource pool includes: the second time-frequency resource set is related to a frequency-domain location of the first time-frequency resource set.

In one embodiment, the above phrase of the second time-frequency resource set being related to a location of the first time-frequency resource set in the first time-frequency resource pool includes: the second time-frequency resource set is unrelated to a location of other time-frequency resources in addition to the first time-frequency resource set in the first time-frequency resource pool.

In one embodiment, the above phrase of the second time-frequency resource set being related to a location of the first time-frequency resource set in the first time-frequency resource pool includes: the second time-frequency resource set is one of K1 second-type time-frequency resource sets; the first time-frequency resource pool comprises K1 first-type time-frequency resource sets, and the first time-frequency resource set is one of the K1 first-type time-frequency resource sets; the K1 second-type time-frequency resource sets respectively correspond to the K1 first-type time-frequency resource sets; a location of the first time-frequency resource set in the first time-frequency resource pool is used to determine a location of the second time-frequency resource set in the K1 second-type time-frequency resource sets.

In one subembodiment of the above embodiment, the K1 second-type time-frequency resource sets are respectively reserved for feeding back K1 radio signals transmitted on the K1 first-type time-frequency resource sets.

In one embodiment, the above phrase of the third time-frequency resource set being unrelated to a location of the first time-frequency resource set in the first time-frequency resource pool includes: when the first field in the first signaling indicates the third time-frequency resource set out of the second time-frequency resource set and the third time-frequency resource set, and for all data from a second node in the first time-frequency resource pool, the first node transmits a corresponding HARQ-ACK in the third time-frequency resource set, and the second node is a transmitter of the first signaling.

In one embodiment, the above phrase of the third time-frequency resource set being unrelated to a location of the first time-frequency resource set in the first time-frequency resource pool includes: the third time-frequency resource set is unrelated to a time-domain location and a frequency-domain location of the first time-frequency resource set in the first time-frequency resource pool.

In one embodiment, the above phrase of the third time-frequency resource set being unrelated to a location of the first time-frequency resource set in the first time-frequency resource pool includes: the first time-frequency resource pool comprises K1 first-type time-frequency resource sets, K1 being a positive integer greater than 1, a number of information bits carried by the third time-frequency resource set is related to a value of K1, and is unrelated to a location of the first time-frequency resource set in the first time-frequency resource pool.

In one embodiment, when the first field in the first signaling indicates the third time-frequency resource set out of the second time-frequency resource set and the third time-frequency resource set, a number of information bits carried by the third time-frequency resource set is predefined, or a number of information bits carried by the third time-frequency resource set is fixed.

In one embodiment, the first time-frequency-resource group set occupies at least one RE.

In one embodiment, the first time-frequency resource set occupies at least one subcarrier in frequency domain, and occupies at least one multicarrier symbol in time domain.

In one embodiment, there at least exists one RE belonging to the first time-frequency resource pool but not belonging to the first time-frequency resource set.

In one embodiment, the first time-frequency resource pool comprises at least one OFDM symbol not belonging to the first time-frequency resource set in time domain.

In one embodiment, the first time-frequency resource pool comprises at least one multicarrier symbol not belonging to the first time-frequency resource set in time domain.

In one embodiment, the second time-frequency-resource group set occupies at least one RE.

In one embodiment, the second time-frequency resource set occupies at least one subcarrier in frequency domain, and occupies at least one multicarrier symbol in time domain.

In one embodiment, the third time-frequency resource set occupies at least one RE.

In one embodiment, the third time-frequency resource set occupies at least one subcarrier in frequency domain, and occupies at least one multicarrier symbol in time domain.

In one embodiment, the second time-frequency resource set and the third time-frequency resource set are respectively reserved for a physical layer channel.

In one embodiment, the second time-frequency resource set and the third time-frequency resource set are orthogonal in time domain.

In one embodiment, there does not exist a multicarrier symbol belonging to time-domain resources occupied by the second time-frequency resource set and time-domain resources occupied by the third time-frequency resource set at the same time.

In one embodiment, time-domain resources occupied by the second time-frequency resource set are before time-domain resources occupied by the third time-frequency resource set.

In one embodiment, the first signaling comprises scheduling information of the first signal.

In one subembodiment of the embodiment, the scheduling information of the first signal comprises time-frequency resources occupied by the first signal and an MCS adopted by the first signal.

In one subembodiment of the embodiment, the scheduling information of the first signal comprises an RV of the first signal.

In one subembodiment of the embodiment, the scheduling information of the first signal comprises a HARQ-ACK process number of the first signal.

In one embodiment, the multicarrier symbol in the present disclosure is an Orthogonal Frequency Division Multiplexing (OFDM) symbol.

In one embodiment, the multicarrier symbol in the present disclosure is a Single Carrier-Frequency Division Multiple Access (SC-FDMA) symbol.

In one embodiment, the multicarrier symbol in the present disclosure is a Filter Bank Multi Carrier (FBMC) symbol.

In one embodiment, the multicarrier symbol in the present disclosure is an PFDM symbol comprising a Cyclic Prefix (CP).

In one embodiment, the multicarrier symbol in the present disclosure is a Discrete Fourier Transform Spreading Orthogonal Frequency Division Multiplexing (DFT-s-OFDM) symbol comprising a CP.

In one embodiment, the first signaling is transmitted on sidelink.

In one embodiment, the first signal is transmitted on sidelink.

In one embodiment, the first information set is transmitted on sidelink.

In one embodiment, the first field is configured by an RRC signaling to indicate the target time-frequency resource set out of the second time-frequency resource set and the third time-frequency resource set.

In one embodiment, whether the first field is used to indicate the target time-frequency resource set out of the second time-frequency resource set and the third time-frequency resource set is related to a release number of the first node.

In one embodiment, whether the first field is used to indicate the target time-frequency resource set out of the second time-frequency resource set and the third time-frequency resource set is related to a capability of the first node.

In one embodiment, the sidelink refers to a radio link between terminals.

In one embodiment, the cellular link in the present disclosure is a radio link between a terminal and a base station.

In one embodiment, the sidelink in the present disclosure corresponds to a Proximity Communication (PC)-5 interface.

In one embodiment, the cellular link in the present disclosure corresponds to a Uu interface.

In one embodiment, the sidelink in the present disclosure is used for V2X communications.

In one embodiment, the cellular link in the present disclosure is used for cellular communications.

In one embodiment, the resource element in the present disclosure occupies a subcarrier in frequency domain and a multicarrier symbol in time domain.

Embodiment 2

Figure 2:
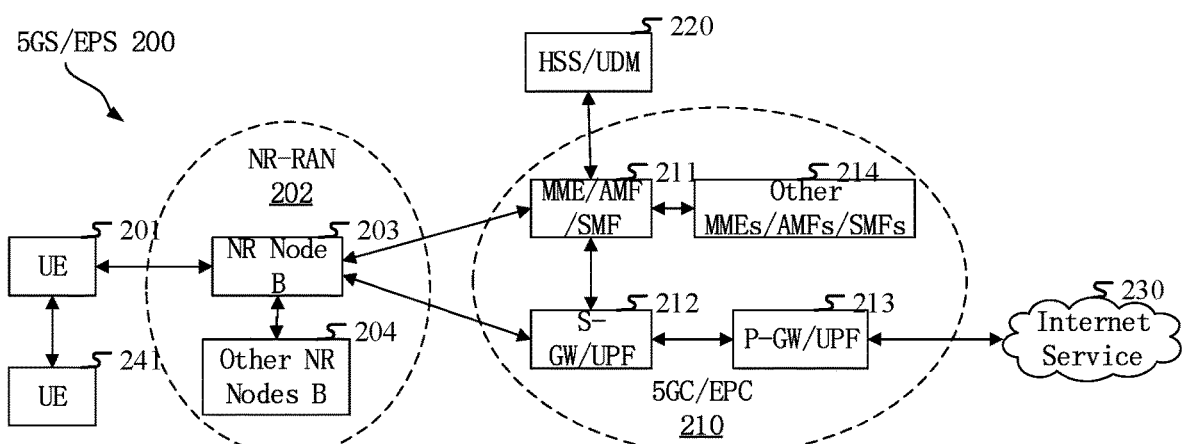
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LIE-A) systems. The 5G NR or LIE network architecture 200 may be called a 5G System (5GS)/Evolved Packet System (EPS) 200 or other appropriate terms. The 5GS/EPS 200 may comprise one or more UEs 201, a UE 241 that is in V2X communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

In one embodiment, the gNB 203 corresponds to the third node in the present disclosure.

In one embodiment, an air interface between the UE 201 and the gNB 203 is a Uu interface.

In one embodiment, an air interface between the UE 201 and the UE 241 is a PC-5 interface.

In one embodiment, a radio link between the UE 201 and the gNB 203 is a cellular link.

In one embodiment, a radio link between the UE 201 and the UE 241 is a sidelink.

In one embodiment, the first node in the present disclosure is a terminal within the coverage of the gNB 203.

In one embodiment, the second node in the present disclosure is a terminal within the coverage of the gNB 203.

In one embodiment, the second node in the present disclosure is a terminal without the coverage of the gNB 203.

In one embodiment, unicast transmission is supported between the UE 201 and the UE 241.

In one embodiment, broadcast transmission is supported between the UE 201 and the UE 241.

In one embodiment, groupcast transmission is supported between the UE 201 and the UE 241.

In one embodiment, the first node and the second node belong to a V2X pair.

In one embodiment, the first node is a car.

In one embodiment, the first node is a vehicle.

In one embodiment, the first node is a Road Side Unit (RSU).

In one embodiment, the first node is a group header of a terminal group.

In one embodiment, the second node is a vehicle.

In one embodiment, the second node is a car.

In one embodiment, the second node is an RSU.

In one embodiment, the second node is a group header of a terminal group.

In one embodiment, the third node is a base station.

In one embodiment, the third node is a serving cell.

Embodiment 3

Figure 3:
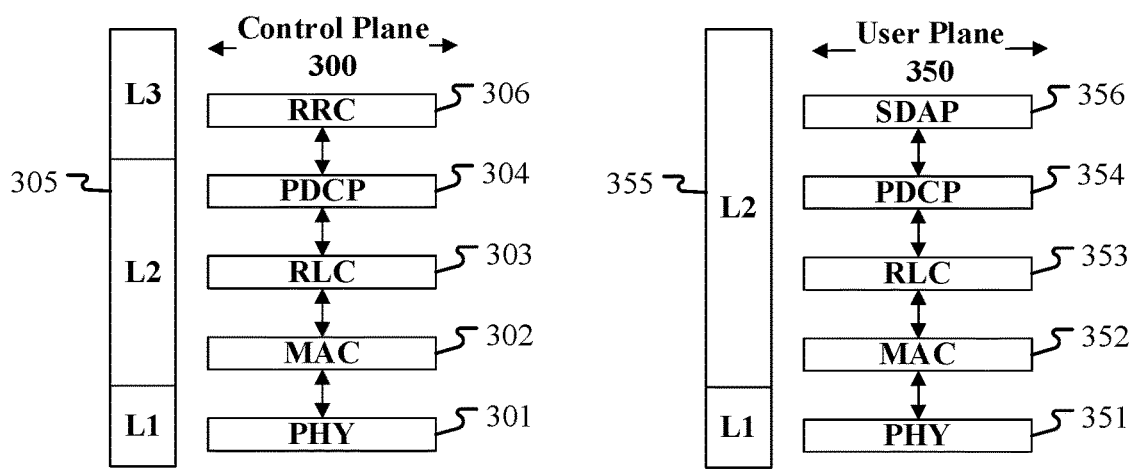
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first signaling is generated by the PHY 301 or the PHY 351.

In one embodiment, the first signaling is generated by the MAC 352 or the MAC 302.

In one embodiment, the first signal is generated by the PHY 301 or the PHY 351.

In one embodiment, the first signal is generated by the MAC 352 or the MAC 302.

In one embodiment, the first information set is generated by the PHY 301 or the PHY 351.

In one embodiment, the first information set is generated by the MAC 352 or the MAC 302

In one embodiment, the second signaling is generated by the MAC 352 or the MAC 302.

In one embodiment, the second signaling is generated by the RRC 306.

In one embodiment, the third signaling is generated by the MAC 352 or the MAC 302.

In one embodiment, the third signaling is generated by the RRC 306.

Embodiment 4

Figure 4:
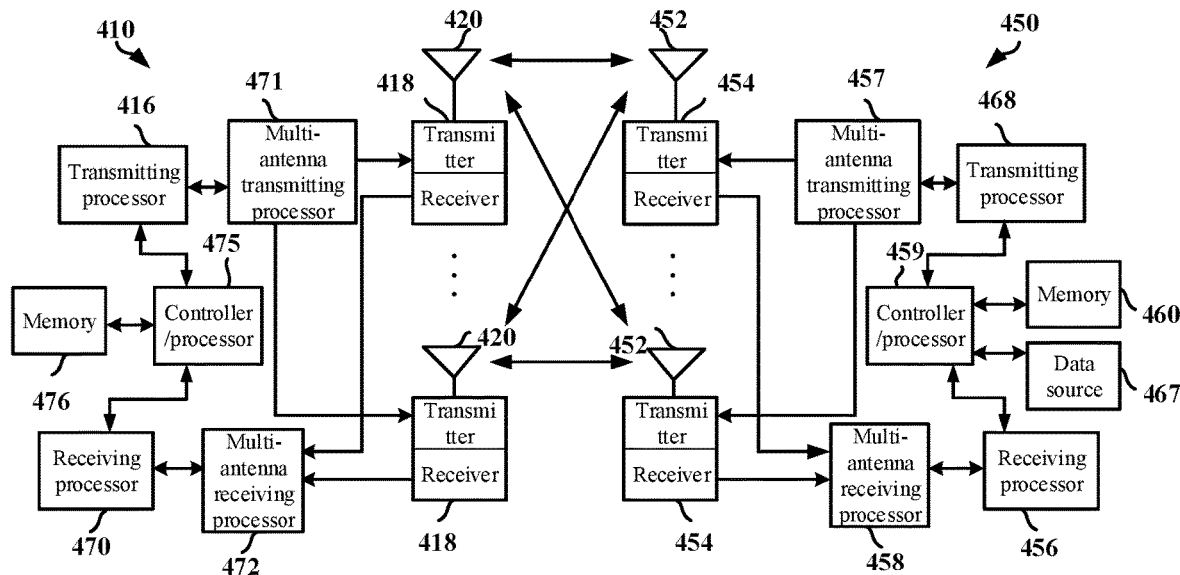
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least: receives a first signaling, receives a first signal in a first time-frequency resource set, the first time-frequency resource set belongs to a first time-frequency resource pool; and transmits a first information set in a target time-frequency resource set; the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, the first communication device 450 comprises at least one processor and at least one memory. a memory that stores a computer readable instruction program. The computer readable instruction program generates an action when executed by at least one processor. The action includes: receiving a first signaling, receiving a first signal in a first time-frequency resource set, the first time-frequency resource set belonging to a first time-frequency resource pool; and transmitting a first information set in a target time-frequency resource set; the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first signaling, transmits a first signal in a first time-frequency resource set, the first time-frequency resource set belongs to a first time-frequency resource pool; and receives a first information set in a target time-frequency resource set; the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, the second communication device 410 comprises a memory that stores a computer readable instruction program. The computer readable instruction program generates an action when executed by at least one processor. The action includes: transmitting a first signaling, transmitting a first signal in a first time-frequency resource set, the first time-frequency resource set belonging to a first time-frequency resource pool; and receiving a first information set in a target time-frequency resource set; the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a second signaling; a first field in a first signaling reuses a field in an SCI format supported by a legal terminal for indicating whether a HARQ-ACK for a first signal is used; the second signaling indicates that the field in the first signaling is reinterpreted as: when the first field in the first signaling indicates that a HARQ-ACK for the first signal is used, a target time-frequency resource set is a second time-frequency resource set, and when the first field in the first signaling indicates that a HARQ-ACK for the first signal is not used, a target time-frequency resource set is a third time-frequency resource set; a receiver of the second signaling comprises a first node, the first node receives the first signaling, receives a first signal in a first time-frequency resource set, and transmits a first information set in the target time-frequency resource set; the first time-frequency resource set belongs to a first time-frequency resource pool; the first signaling comprises the first field, the target time-frequency resource set is one of the second time-frequency resource set and the third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, the second communication device 410 comprises a memory that stores a computer readable instruction program. The computer readable instruction program generates an action when executed by at least one processor. The action includes: transmitting a second signaling; a first field in a first signaling reuses a field in an SCI format supported by a legal terminal for indicating whether a HARQ-ACK for a first signal is used; the second signaling indicates that the field in the first signaling is reinterpreted as: when the first field in the first signaling indicates that a HARQ-ACK for the first signal is used, a target time-frequency resource set is a second time-frequency resource set, and when the first field in the first signaling indicates that a HARQ-ACK for the first signal is not used, a target time-frequency resource set is a third time-frequency resource set; a receiver of the second signaling comprises a first node, the first node receives the first signaling, receives a first signal in a first time-frequency resource set, and transmits a first information set in the target time-frequency resource set; the first time-frequency resource set belongs to a first time-frequency resource pool; the first signaling comprises the first field, the target time-frequency resource set is one of the second time-frequency resource set and the third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, the first communication device 450 corresponds to a first node in the present disclosure.

In one embodiment, the second communication device 410 corresponds to a second node in the present disclosure.

In one embodiment, the second communication device 410 corresponds to a third node in the present disclosure.

In one embodiment, the first communication device 450 is a UE.

In one embodiment, the second communication device 410 is a UE.

In one embodiment, the second communication device 410 is a base station.

In one embodiment, at least one of the antenna 452, the receiver 454, the multi-antenna receiving processor 458, the receiving processor 456 or the controller/processor 459 is used to receive a first signaling; and at least one of the antenna 420, the transmitter 418, the multi-antenna transmitting processor 471, the transmitting processor 416 or the controller/processor 475 is used to transmit a first signaling.

In one embodiment, at least one of the antenna 452, the receiver 454, the multi-antenna receiving processor 458, the receiving processor 456 and the controller/processor 459 is used to receive a first signal in a first time-frequency resource set; and at least one of the antenna 420, the transmitter 418, the multi-antenna transmitting processor 471, the transmitting processor 416 and the controller/processor 475 is used to transmit a first signal in a first time-frequency resource set.

In one embodiment, at least one of the antenna 452, the transmitter 454, the multi-antenna transmitting processor 457, the transmitting processor 468, and the controller/processor 459 is used to transmit a first information set in a target time-frequency resource set; at least one of the antenna 420, the receiver 418, the multi-antenna receiving processor 472, the receiving processor 470 and the controller/processor 475 is used to receive a first information set in a target time-frequency resource set.

In one embodiment, at least one of the antenna 452, the receiver 454, the multi-antenna receiving processor 458, the receiving processor 456 or the controller/processor 459 is used to receive a second signaling; and at least one of the antenna 420, the transmitter 418, the multi-antenna transmitting processor 471, the transmitting processor 416 or the controller/processor 475 is used to transmit a second signaling.

In one embodiment, at least one of the antenna 452, the receiver 454, the multi-antenna receiving processor 458, the receiving processor 456 or the controller/processor 459 is used to receive a third signaling; and at least one of the antenna 420, the transmitter 418, the multi-antenna transmitting processor 471, the transmitting processor 416 or the controller/processor 475 is used to transmit a third signaling.

In one embodiment, at least one of the antenna 420, the receiver 418, the multi-antenna receiving processor 472, the receiving processor 470, or the controller/processor 475 is used to perform monitoring in K3 first-type time-frequency resource set(s).

Embodiment 5

Figure 5:
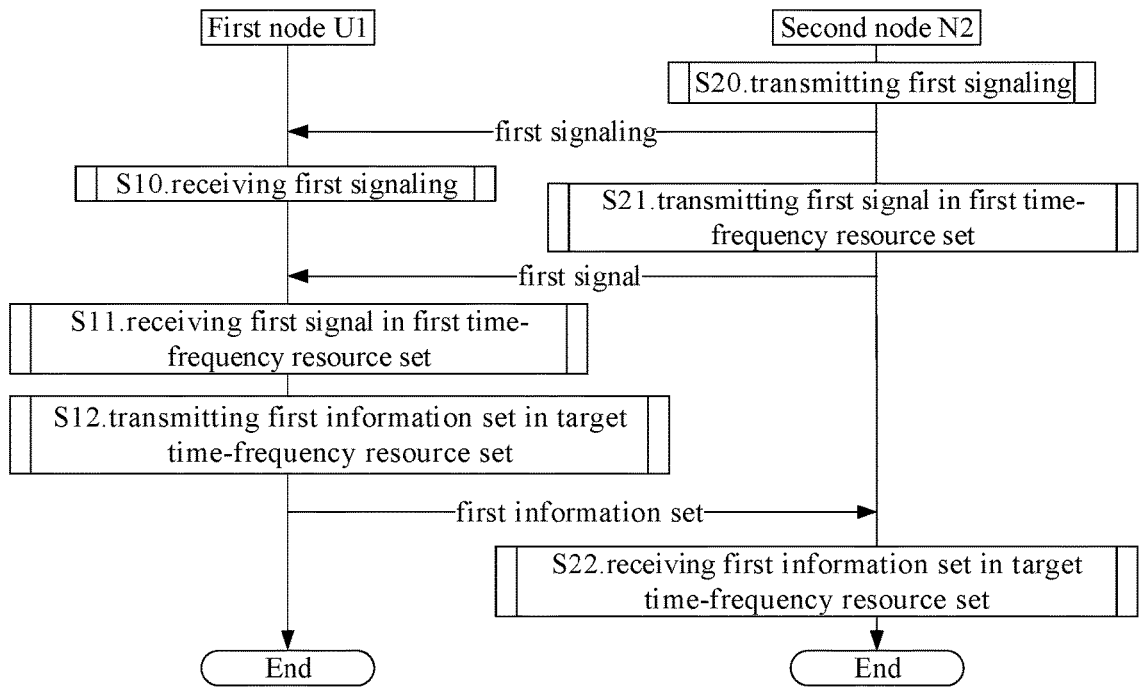
FIG. 5 illustrates a flowchart of a first signaling according to one embodiment of the present disclosure.

Embodiment 5 illustrates a flowchart of a first signaling, as shown in FIG. 5. In FIG. 5, a first node U1 and a second node U2 are in communication via a radio link.

The first node U1 receives a first signaling in step S10, receives a first signal in a first time-frequency resource set in step S11, and transmits a first information set in a target time-frequency resource set in step S12.

The second node U2 transmits a first signaling in step S20, transmits a first signal in a first time-frequency resource set in step S21, and receives a first information set in a target time-frequency resource set in step S122.

In embodiment 5, the first time-frequency resource set belongs to a first time-frequency resource pool; the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, a radio link between the first node U1 and the second node U2 is sidelink.

In one embodiment, an air interface between the first node U1 and the second node U2 is a PC5 interface.

In one embodiment, the target time-frequency resource set is unrelated to a number of bit blocks detected by the first node U1 in the first time-frequency resource pool, and the bit block comprises information bits and cyclic redundancy check bits.

In one subembodiment of the embodiment, the bit block is a Transport Block (1B).

In one subembodiment of the embodiment, the bit block is a Code Block Group.

In one subembodiment of the embodiment, the first time-frequency resource pool is used to transmit a plurality of bit blocks, a first bit block is used to generate the first signal, and the first bit block is one of the plurality of bit blocks.

In one embodiment, the first field in the first signaling reuses a field in an SCI format supported by a legal terminal for indicating HARQ feedback selection 1 or HARQ feedback selection 2, the HARQ feedback selection 1 is to only feed back a NACK, and the HARQ feedback selection 2 is to feed back both an ACK and a NACK.

In one subembodiment of the embodiment, the legal terminal is a terminal that supports release 16.

In one subembodiment of the embodiment, the first signaling is an SCI format supported by the legal terminal.

In one subembodiment of the embodiment, the first signaling comprises a second field, and the second field in the first signaling comprises a field in an SCI format supported by a legal terminal for indicating whether a HARQ-ACK for the first signal is used.

In one subsidiary embodiment of the above subembodiment, the second field only comprises one bit.

In one subsidiary embodiment of the above subembodiment, the first field only comprises one bit.

In one subsidiary embodiment of the above subembodiment, the second field indicates that a HARQ-ACK for the first signal of the first node U1 is used.

In one subsidiary embodiment of the above subembodiment, the second field indicates that a HARQ-ACK for the first signal of the first node U1 is not used.

In one subsidiary embodiment of the above subembodiment, only when the second field in the first signaling indicates that a HARQ-ACK for the first signal is not used, the first field in the first signaling indicates the target time-frequency resource set out of the second time-frequency resource set and the third time-frequency resource set.

In one subsidiary embodiment of the above subembodiment, the meaning of the above phrase of the second field in the first signaling indicating whether a HARQ-ACK for the first signal is used includes: the second node U2 indicates whether the first node U1 detects a HARQ-ACK for the first signal in the second time-frequency resource set.

In one subsidiary embodiment of the above subembodiment, the above phrase of the second field in the first signaling indicating whether a HARQ-ACK for the first signal is used includes: whether the first node U1 transmits a HARQ-ACK for the first signal in the second time-frequency resource set.

In one subsidiary embodiment of the above subembodiment, when the second field in the first signaling indicates that a HARQ-ACK for the first signal is used, the first node U1 interprets the first field and the second field in the first signaling according to a legal terminal, and performs corresponding operations.

In one subembodiment of the embodiment, the first field is used to indicate the following four operations of the first node U1:

operation 1: not giving feedback on whether the first signal is correctly received;

operation 2: feeding back a NACK only when the first signal is wrongly received, and the target time-frequency resource set is the second time-frequency resource set;

operation 3: feeding back an ACK when the first signal is correctly received, or feeding back a NACK when the first signal is wrongly received, and the target time-frequency resource set is the second time-frequency resource set;

operation 4: feeding back an ACK when the first signal is correctly received, or feeding back a NACK when the first signal is wrongly received, and the target time-frequency resource set is the third time-frequency resource set.

In one subsidiary embodiment of the above subembodiment, for the operation 1, the second node U2 does not detect a HARQ feedback for the first signal in both the second time-frequency resource set and the third time-frequency resource set.

In one subsidiary embodiment of the above subembodiment, for the operation 2, the second node U2 detects a HARQ-NACK for the first signal in the second time-frequency resource set.

In one subsidiary embodiment of the above subembodiment, for the operation 3, the second node U2 detects a HARQ feedback for the first signal in the second time-frequency resource set.

In one subsidiary embodiment of the above subembodiment, for the operation 4, the second node U2 detects a HARQ feedback for the first signal in the third time-frequency resource set.

In one embodiment, the first information set adopts different transmission methods respectively in the second time-frequency resource set and the third time-frequency resource set.

In one subembodiment of the embodiment, the first information set is carried through sequence in the second time-frequency resource set.

In one subembodiment of the embodiment, the second time-frequency resource set is only used to carry the first information set.

In one subembodiment of the embodiment, the first information set is multiplexed with other information sets in the third time-frequency resource set.

In one subembodiment of the embodiment, the third time-frequency resource set carries the K1 information sets in the present disclosure, the first information set is one of the K1 information sets, the K1 information sets are respectively used to determine whether K1 first-type signals are correctly received, the K1 first-type signals are respectively transmitted in K1 first-type time-frequency resource sets, the first time-frequency resource pool comprises the K1 first-type time-frequency resource sets, the K1 information sets are jointly encoded, and the K1 information sets share one CRC.

In one embodiment, the first time-frequency resource pool comprises K1 first-type time-frequency resource sets, the first time-frequency resource set is one of the K1 first-type time-frequency resource sets, and a location of the first time-frequency resource set in the first-type time-frequency resource set is used to determine whether the third time-frequency resource set carries the first information set.

In one subembodiment of the embodiment, the first time-frequency resource set is an earliest one of the K1 first-type time-frequency resource sets in time domain, the third time-frequency resource set is used to carry the first information set, and the first field indicates that the target time-frequency resource set is the third time-frequency resource set.

In one subembodiment of the embodiment, the first time-frequency resource set is not an earliest one of the K1 first-type time-frequency resource sets in time domain, the second time-frequency resource set is used to carry the first information set, and the first field indicates that the target time-frequency resource set is the second time-frequency resource set.

In one embodiment, the first time-frequency resource pool comprises K1 first-type time-frequency resource sets, the first time-frequency resource set is one of the K1 first-type time-frequency resource sets, and the first information set is associated with the K1 first-type time-frequency resource sets; the first signaling comprises a third field, the second node U2 occupies K2 first-type time-frequency resource set(s) in the K1 first-type time-frequency resource sets for a transmission for the first node U1, and the third field is used to indicate a location of the first time-frequency resource set in the K2 first-type time-frequency resource set(s); K2 is a positive integer not greater than K1.

In one subembodiment of the embodiment, the first information set is used to indicate whether K2 radio signal(s) transmitted on the K2 first-type time-frequency resource set(s) is(are) correctly received by the first node U1.

In one subsidiary embodiment of the above subembodiment, the first information set comprises K1 bits, the K1 bits are respectively associated with the K1 first-type time-frequency resource sets, and the K1 bits are used to indicate whether K1 transmissions on the K1 first-type time-frequency resource sets are correctly received.

In one subsidiary embodiment of the above subembodiment, the first information set comprises K2 bit(s), the K2 bit(s) is(are respectively) associated with the K2 first-type time-frequency resource set(s), and the K2 bit(s) is(are) used to indicate whether the K2 radio signal(s) is(are) correctly received.

In one subsidiary embodiment of the above subembodiment, the first information set comprises only one bit, the one bit is used to indicate that each of the K2 radio signal(s) is correctly received.

In one subsidiary embodiment of the above subembodiment, the first information set only comprises one bit, the one bit is used to indicate that at least one of the K2 radio signal(s) is not correctly received.

In one subembodiment of the embodiment, when the first field is used to indicate that the target time-frequency resource set is the third time-frequency resource set, the first signaling comprises the third field.

In one subembodiment of the embodiment, when the first field is not used to indicate that the third time-frequency resource set is the target time-frequency resource set, the first signaling does not comprise the third field.

In one subembodiment of the embodiment, when the second field in the present disclosure indicates that a HARQ-ACK of the first node for the first signal is used, the first signaling comprises the third field.

In one subembodiment of the embodiment, when the second signaling in the present disclosure is transmitted, the first signaling comprises the third field.

Embodiment 6

Figure 6:
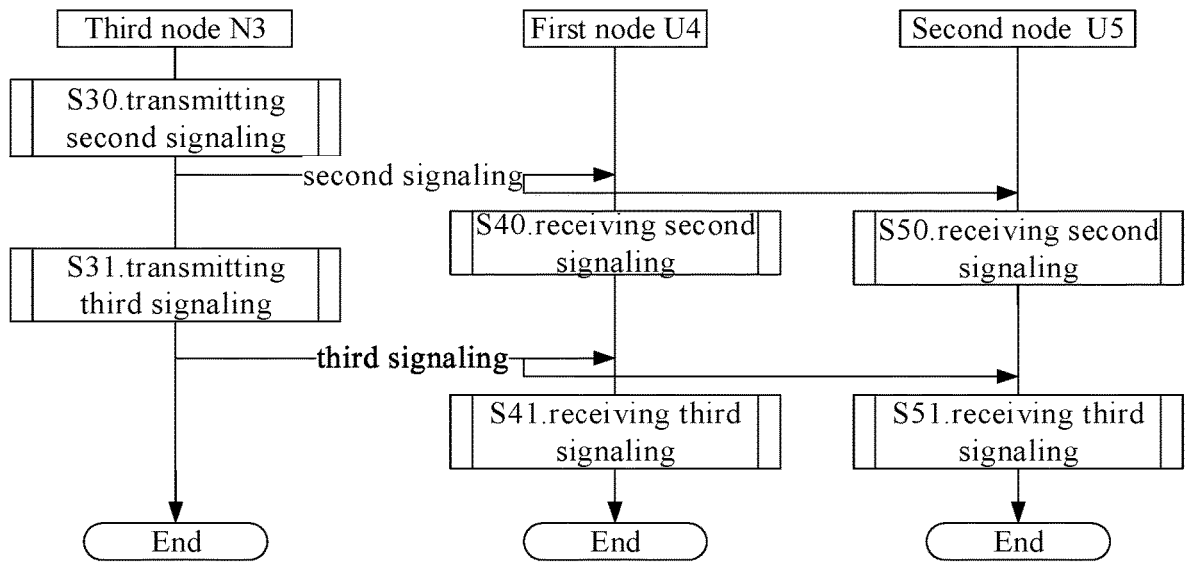
FIG. 6 illustrates a flowchart of a second signaling and a third signaling according to one embodiment of the present disclosure.

Embodiment 6 illustrates a schematic diagram of a second signaling and a third signaling, as shown in FIG. 6. In FIG. 6, a third node N3 is in communications with a first node U4 and a second node U5 via cellular links.

The embodiments in embodiment 6 can be applied to the embodiment 5 without conflict.

The first node U4 receives a second signaling in step S40 and receives a third signaling in step S41.

The second node U5 receives a second signaling in step S50 and receives a third signaling in step S51.

The third node N3 transmits a second signaling in step S30 and transmits a third signaling in step S31.

In embodiment, the first field in the first signaling in the present disclosure reuses a field in an SCI format supported by a legal terminal for indicating whether a HARQ-ACK for the first signal is used; the second signaling indicates that the field in the first signaling is reinterpreted as: when the first field in the first signaling indicates that a HARQ-ACK for the first signal is used, the target time-frequency resource set is the second time-frequency resource set, and when the first field in the first signaling indicates that a HARQ-ACK for the first signal is not used, the target time-frequency resource set is the third time-frequency resource set; the third signaling indicates that the first time-frequency resource pool is associated with the third time-frequency resource set.

In one embodiment, the legal terminal is a terminal supporting release 16.

In one embodiment, the first signaling is an SCI format supported by the legal terminal.

In one embodiment, the second signaling is a higher-layer signaling.

In one embodiment, the second signaling is broadcast.

In one embodiment, the second signaling is an RRC signaling.

In one embodiment, the second signaling is not interpretable to the legal terminal.

In one embodiment, the first field in the first signaling consists of one bit.

In one embodiment, when the first field in the first signaling indicates that a HARQ-ACK for the first signal is used, the legal terminal cannot assume that the second time-frequency resource set is not occupied, and when the first field in the first signaling indicates that a HARQ-ACK for the first signal is not used, the legal terminal can assume that the second time-frequency resource set is not occupied.

In one embodiment, the third signaling is a downlink signaling.

In one embodiment, the third signaling is broadcast.

In one embodiment, any two slots occupied by the first time-frequency resource pool are discontinuous.

In one embodiment, the third signaling is an RRC signaling.

In one embodiment, the third signaling is cell-common.

In one embodiment, the third signaling indicates that the first time-frequency resource pool is associated with K1 second-type time-frequency resource sets, and the second time-frequency resource set is one of the K1 second-type time-frequency resource sets.

In one embodiment, the first node U4 and the first node U1 are a same node.

In one embodiment, the second node U5 and the second node U2 are a same node.

Embodiment 7

Figure 7:
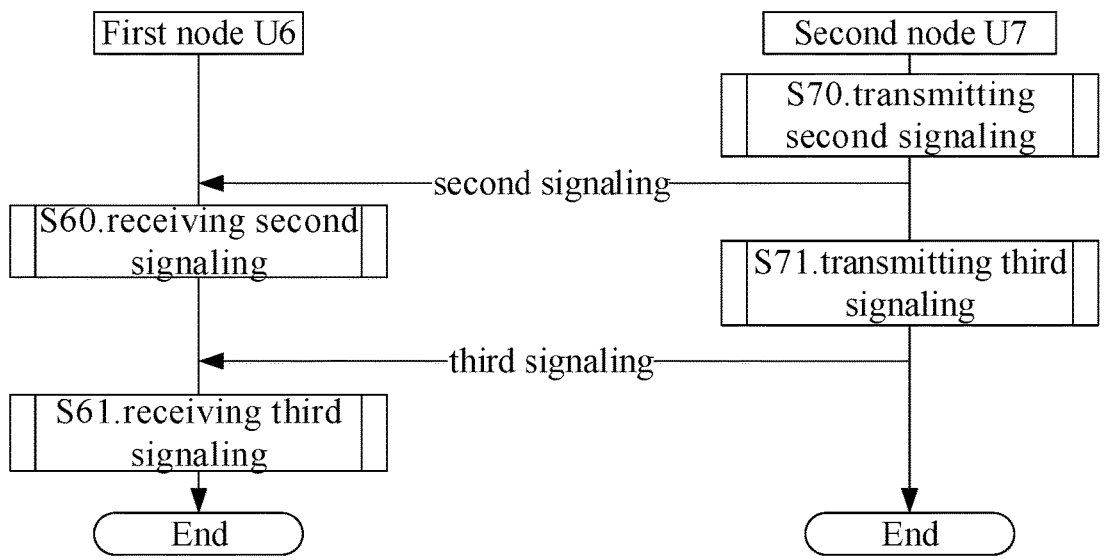
FIG. 7 illustrates a flowchart of a second signaling and a third signaling according to another embodiment of the present disclosure.

Embodiment 7 illustrates another flowchart of a second signaling and a third signaling, as shown in FIG. 7. In FIG. 7, a first node U6 and a second node U7 are in communications via a radio link. The embodiments in embodiment 7 can be applied to embodiment 5 without conflict.

The first node U6 receives a second signaling in step S60 and receives a third signaling in step S61.

The second node U7 transmits a second signaling in step S70 and transmits a third signaling in step S71.

In embodiment, the first field in the first signaling in the present disclosure reuses a field in an SCI format supported by a legal terminal for indicating whether a HARQ-ACK for the first signal is used; the second signaling indicates that the field in the first signaling is reinterpreted as: when the first field in the first signaling indicates that a HARQ-ACK for the first signal is used, the target time-frequency resource set is the second time-frequency resource set, and when the first field in the first signaling indicates that a HARQ-ACK for the first signal is not used, the target time-frequency resource set is the third time-frequency resource set; the third signaling indicates that the first time-frequency resource pool is associated with the third time-frequency resource set.

In one embodiment, the second node U7 and the first node U6 belong to a terminal group, and the second node U7 is a group head in the terminal group.

In one embodiment, the second node U7 is used to schedule the first node U6.

In one embodiment, the second node U7 is a relay node of the first node U6.

In one embodiment, the first node U6 and the first node U1 are a same node.

In one embodiment, the second node U7 and the second node U2 are a same node.

Embodiment 8

Figure 8:
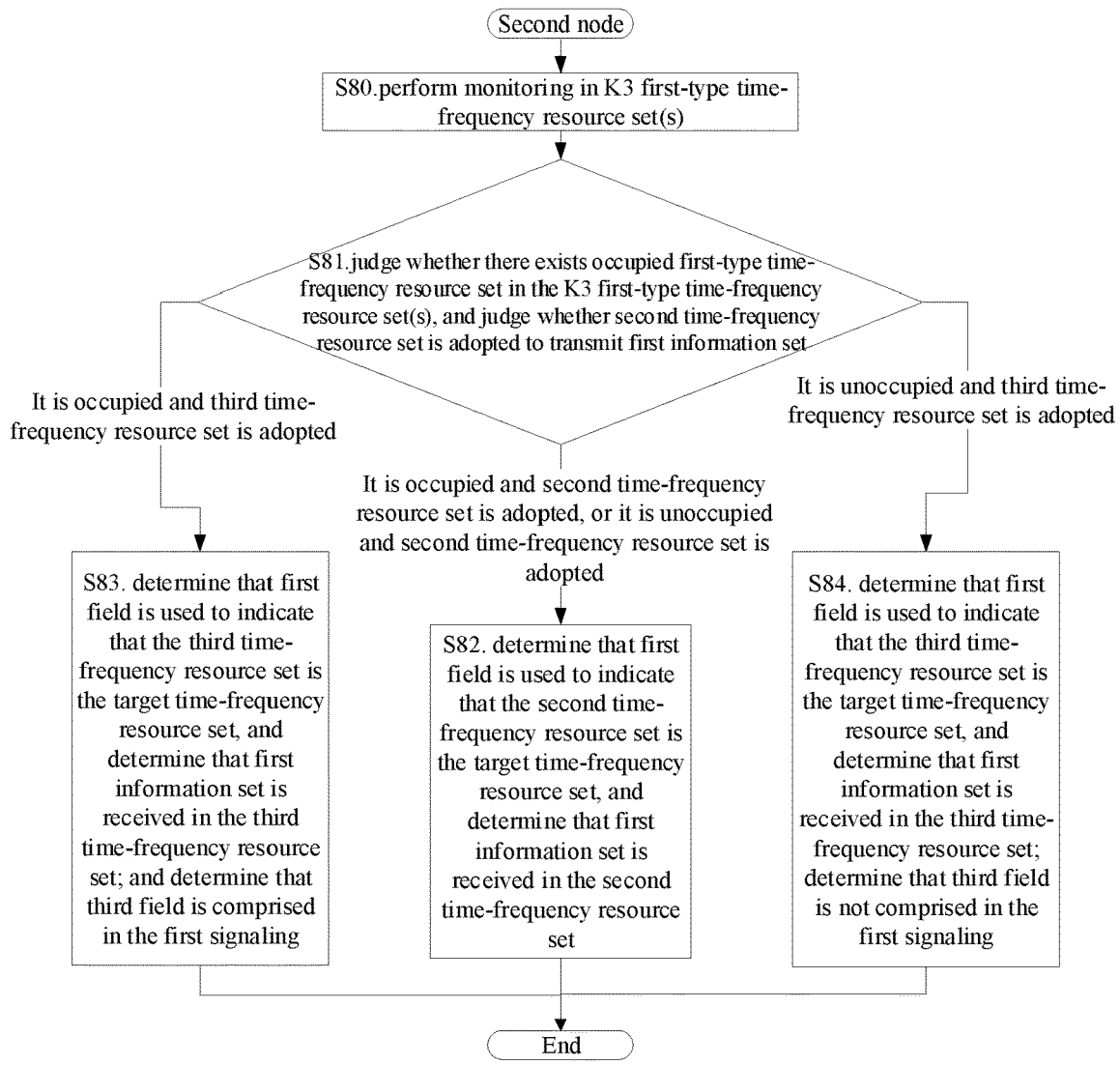
FIG. 8 illustrates a flowchart of monitoring according to one embodiment of the present disclosure.

Embodiment 8 illustrates a flowchart of monitoring, as shown in FIG. 8. In FIG. 8, the second node performs the following steps:

in step 80, monitor in K3 first-type time-frequency resource set(s);

in S81, judge whether there exists an occupied first-type time-frequency resource set in the K3 first-type time-frequency resource set(s), and judge whether the second time-frequency resource set is adopted to transmit a first information set; if it is occupied and a second time-frequency resource set is adopted, go to S82; if it is occupied and a third time-frequency resource set is adopted, go to S83; if it is unoccupied and a second time-frequency resource set is adopted, go to S82; if it is unoccupied and a third time-frequency resource set is adopted, go to S84;

in S82 determine that a first field is used to indicate that the second time-frequency resource set is the target time-frequency resource set, and determine that a first information set is received in the second time-frequency resource set;

in S83, determine that a first field is used to indicate that the third time-frequency resource set is the target time-frequency resource set, and determine that a first information set is received in the third time-frequency resource set; and determine that a third field is comprised in the first signaling;

in S84, determine that a first field is used to indicate that the third time-frequency resource set is the target time-frequency resource set, and determine that a first information set is received in the third time-frequency resource set; and determine that a third field is not comprised in the first signaling.

In embodiment 8, the first time-frequency resource pool in the present disclosure comprises K1 first-type time-frequency resource sets, any of the K3 first-type time-frequency resource set(s) belongs to the first time-frequency resource pool and is located before the first time-frequency resource set in time domain, and a result of the monitoring is used to determine whether the first field indicates that the target time-frequency resource set is the third time-frequency resource set; K3 is a positive integer less than K1.

In one embodiment, the second node determines through monitoring that there exists one of the K3 first-type time-frequency resource set(s) being occupied by a node other than the second node, and the first field indicates that the target time-frequency resource set is the second time-frequency resource set.

In one embodiment, the second node determines through monitoring that any of the K3 first-type time-frequency resource set(s) is not occupied by a node other than the second node, and the first field indicates that the target time-frequency resource set is the third time-frequency resource set.

In one embodiment, the monitoring comprises Listen Before Talk (LBT).

In one embodiment, the monitoring comprises channel sensing.

In one embodiment, the monitoring comprises an energy detection.

In one embodiment, the monitoring comprises a sequence detection.

In one embodiment, the monitoring comprises a demodulation performed on SCI and an energy detection performed on a PSSCH.

Embodiment 9

Figure 9:
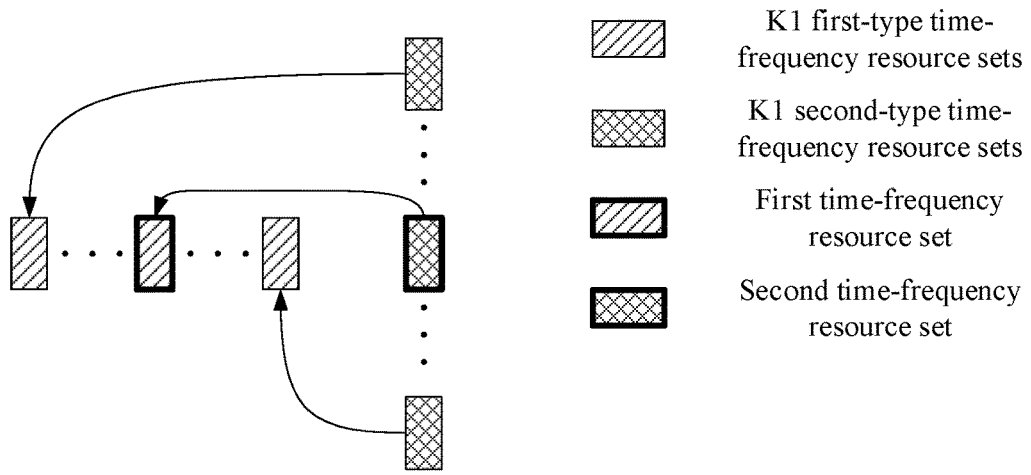
FIG. 9 illustrates a schematic diagram of a first time-frequency resource set and a second time-frequency resource set according to one embodiment of the present disclosure.

Embodiment 9 illustrates a schematic diagram of a first time-frequency resource set and a second time-frequency resource set according to the present disclosure, as shown in FIG. 9. In FIG. 9, the first time-frequency resource pool in the present disclosure comprises K1 first-type time-frequency resource sets, and the first time-frequency resource set is one of the K1 first-type time-frequency resource sets; the K1 first-type time-frequency resource sets are respectively associated with K1 second-type time-frequency resource sets, and the second time-frequency resource set is one of the K1 second-type time-frequency resource sets associated with the first time-frequency resource set.

In one embodiment, any of the K1 first-type time-frequency resource sets comprises at least one RE.

In one embodiment, any of the K1 second-type time-frequency resource sets comprises at least one RE.

In one embodiment, the K1 first-type time-frequency resource sets are used for a transmission of K1 PSSCHs, and the K1 second-type time-frequency resource sets are respectively used to feed back K1 PSFCHs of the K1 PSSCHs.

In one embodiment, the K1 first-type time-frequency resource sets are respectively K1 PSFCH resources.

In one embodiment, the first time-frequency resource pool corresponds to a PSFCH resource set.

In one embodiment, the K1 first-type time-frequency resource sets are respectively K1 PSFCH resource sets.

Embodiment 10

Figure 10:
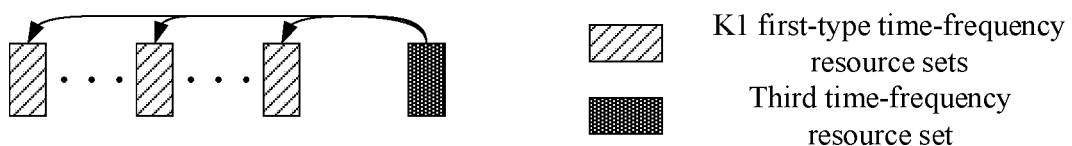
FIG. 10 illustrates a schematic diagram of a first time-frequency resource set and a third time-frequency resource set according to one embodiment of the present disclosure.

Embodiment 10 illustrates a schematic diagram of a first time-frequency resource set and a third time-frequency resource set according to one embodiment of the present disclosure, as shown in FIG. 10. In FIG. 10, the first time-frequency resource pool in the present disclosure comprises K1 first-type time-frequency resource sets, and each of the K1 first-type time-frequency resource sets is associated with the third time-frequency resource set.

In one embodiment, the third time-frequency resource set is used to carry the first information set in the present disclosure, the first information set comprises K1 bits, and the K1 bits are respectively used to indicate whether K1 radio signals transmitted on the K1 first-type time-frequency resource sets are correctly received.

In one embodiment, the third time-frequency resource set is used to carry the first information set in the present disclosure, the first information set only comprises one bit, and the one bit is used to indicate whether K1 radio signals transmitted on the K1 first-type time-frequency resource sets are correctly received.

Embodiment 11

Figure 11:
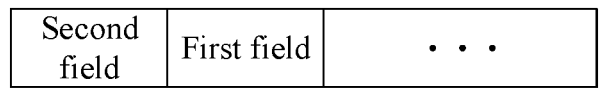
FIG. 11 illustrates a schematic diagram of a first signaling according to one embodiment of the present disclosure.

Embodiment 11 illustrates a schematic diagram of a first signaling according to the present disclosure, as shown in FIG. 11. In FIG. 11, the first signaling comprises a first field and a second field, where the second field is optional.

In one embodiment, the first field comprises 2 bits.

In one embodiment, the second field comprises 1 bit.

In one embodiment, the second field is used to indicate whether the first field is comprised in the first signaling.

In one embodiment, the second field is used to indicate whether the first field is capable of indicating the target time-frequency resource set out of the second time-frequency resource set and the third time-frequency resource set.

In one embodiment, the first signaling comprises a fourth field, and the fourth field is used to indicate one of the following:

a Destination ID of the first node;
a Source ID of the second node;
Group ID;
Zone ID.

In one embodiment, the first signaling is used to indicate a location of frequency-domain resources occupied by the first time-frequency resource set.

In one embodiment, the first signaling is used to indicate a location of time-domain resources occupied by the first time-frequency resource set.

In one embodiment, a payload of the first signaling is variable, and the payload of the first signaling changes with the existence of the second field.

In one embodiment, a payload of the first signaling is fixed, and a value is reserved in the first signaling for the second field to be set to a fixed value when the second field does not exist.

Embodiment 12

Figure 12:
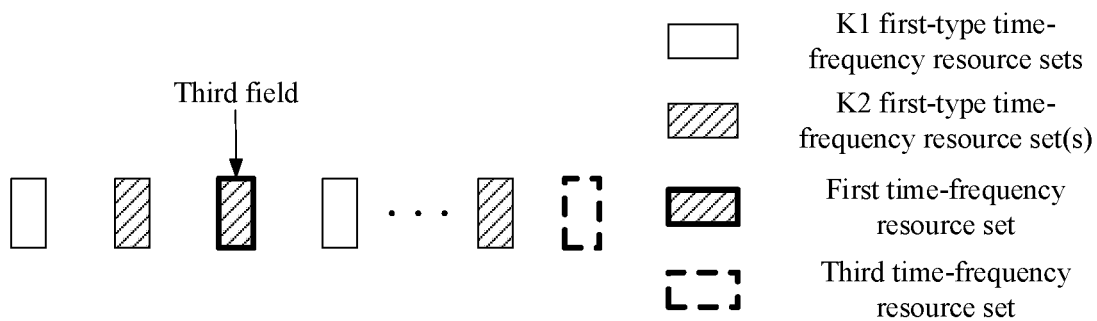
FIG. 12 illustrates a schematic diagram of a third field according to one embodiment of the present disclosure.

Embodiment 12 illustrates a schematic diagram of a third field according to one embodiment of the present disclosure, as shown in FIG. 12. In FIG. 12, the second node occupies K2 first-type time-frequency resource set(s) in the K1 first-type time-frequency resource sets, the K2 first-type time-frequency resource set(s) is(are) used to transmit a radio signal to the first node, a first time-frequency resource set occupied by the first signal is one of the K2 first-type time-frequency resource set(s), and the third field is used to indicate the first time-frequency resource set; K2 is a positive integer not greater than K1.

In one embodiment, the third field is used to indicate the first time-frequency resource set out of the K1 first-type time-frequency resource sets.

In one embodiment, the third field is used to indicate a sequence number of the first time-frequency resource set in the K2 first-type time-frequency resource set(s).

In one embodiment, the third field comprises a sub-field, and the sub-field is used to indicate K2.

Embodiment 13

Figure 13:
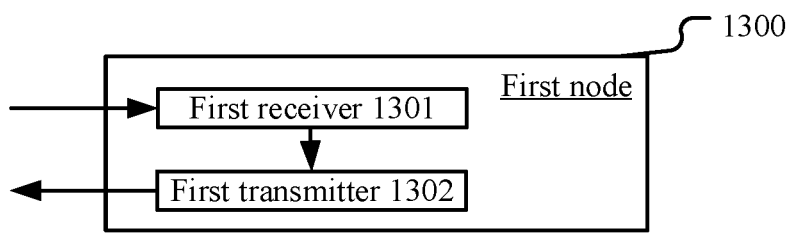
FIG. 13 illustrates a structure block diagram in a first node according to one embodiment of the present disclosure.

Embodiment 13 illustrates a structure block diagram in a first node, as shown in FIG. 13. In FIG. 13, a first node 1300 comprises a first receiver 1301 and a first transmitter 1302.

The first receiver 1301 receives a first signaling, receives a first signal in a first time-frequency resource set, the first time-frequency resource set belongs to a first time-frequency resource pool;

the first transmitter 1302 transmits a first information set in a target time-frequency resource set;

In embodiment 13, the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, the target time-frequency resource set is unrelated to a number of bit block(s) detected by the first node in the first time-frequency resource pool, and the bit block comprises information bits and cyclic redundancy check bits.

In one embodiment, the first field in the first signaling reuses a field in an SCI format supported by a legal terminal for indicating HARQ feedback selection 1 or HARQ feedback selection 2, the HARQ feedback selection 1 is to only feed back a NACK, and the HARQ feedback selection 2 is to feed back both an ACK and a NACK.

In one embodiment, the first receiver 1301 receives a second signaling; the first field in the first signaling reuses a field in an SCI format supported by a legal terminal for indicating whether a HARQ-ACK for the first signal is used;

the second signaling indicates that the field in the first signaling is reinterpreted as: when the first field in the first signaling indicates that a HARQ-ACK for the first signal is used, the target time-frequency resource set is the second time-frequency resource set, and when the first field in the first signaling indicates that a HARQ-ACK for the first signal is not used, the target time-frequency resource set is the third time-frequency resource set.

In one embodiment, the first receiver 1301 receives a third signaling; the third signaling indicates that the first time-frequency resource pool is associated with the third time-frequency resource set.

In one embodiment, the first information set adopts different transmission methods respectively in the second time-frequency resource set and the third time-frequency resource set.

In one embodiment, the first time-frequency resource pool comprises K1 first-type time-frequency resource sets, the first time-frequency resource set is one of the K1 first-type time-frequency resource sets, and a location of the first time-frequency resource set in the first-type time-frequency resource set is used to determine whether the third time-frequency resource set carries the first information set.

In one embodiment, the first time-frequency resource pool comprises K1 first-type time-frequency resource sets, the first time-frequency resource set is one of the K1 first-type time-frequency resource sets, and the first information set is associated with the K1 first-type time-frequency resource sets; the first signaling comprises a third field, a transmitter of the first signaling occupies K2 first-type time-frequency resource set(s) in the K1 first-type time-frequency resource sets for a transmission to the first node, and the third field is used to indicate a location of the first time-frequency resource set in the K2 first-type time-frequency resource set(s); K2 is a positive integer not greater than K1.

In one embodiment, the first receiver 1301 comprises at least first four of the antenna 452, the receiver 454, the multi-antenna receiving processor 458, the receiving processor 456 and the controller/processor 459 in embodiment 4.

In one embodiment, the first transmitter 1302 comprises at least the first four of the antenna 452, the transmitter 454, the multi-antenna transmitting processor 457, the transmitting processor 468 and the controller/processor 459 in embodiment 4.

Embodiment 14

Figure 14:
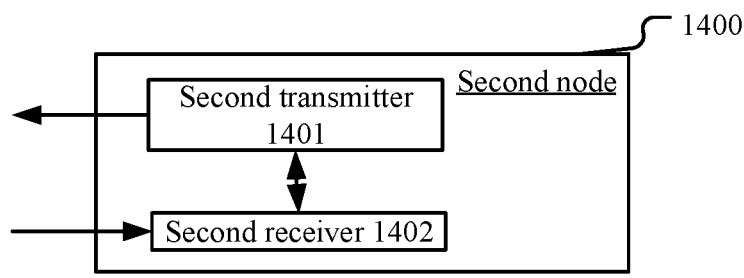
FIG. 14 illustrates a structure block diagram in a second node according to one embodiment of the present disclosure.

Embodiment 14 illustrates a structure block diagram of in a second node, as shown in FIG. 14. In FIG. 14, a second node 1400 comprises a second transmitter 1401 and a second receiver 1402.

The second transmitter 1401 transmits a first signaling, transmits a first signal in a first time-frequency resource set, and the first time-frequency resource set belongs to a first time-frequency resource pool;

the second receiver 1402 receives a first information set in a target time-frequency resource set;

In embodiment 14, the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, the target time-frequency resource set is unrelated to a number of bit block(s) detected by the first node in the first time-frequency resource pool, and the bit block comprises information bits and cyclic redundancy check bits.

In one embodiment, the first field in the first signaling reuses a field in an SCI format supported by a legal terminal for indicating HARQ feedback selection 1 or HARQ feedback selection 2, the HARQ feedback selection 1 is to only feed back a NACK, and the HARQ feedback selection 2 is to feed back both an ACK and a NACK.

In one embodiment, the second receiver 1402 receives a second signaling; the first field in the first signaling reuses a field in an SCI format supported by a legal terminal for indicating whether a HARQ-ACK for the first signal is used; the second signaling indicates that the field in the first signaling is reinterpreted as: when the first field in the first signaling indicates that a HARQ-ACK for the first signal is used, the target time-frequency resource set is the second time-frequency resource set, and when the first field in the first signaling indicates that a HARQ-ACK for the first signal is not used, the target time-frequency resource set is the third time-frequency resource set.

In one embodiment, the second transmitter 1401 transmits a second signaling; the first field in the first signaling reuses a field in an SCI format supported by a legal terminal for indicating whether a HARQ-ACK for the first signal is used; the second signaling indicates that the field in the first signaling is reinterpreted as: when the first field in the first signaling indicates that a HARQ-ACK for the first signal is used, the target time-frequency resource set is the second time-frequency resource set, and when the first field in the first signaling indicates that a HARQ-ACK for the first signal is not used, the target time-frequency resource set is the third time-frequency resource set.

In one embodiment, the second receiver 1402 receives a third signaling; the third signaling indicates that the first time-frequency resource pool is associated with the third time-frequency resource set.

In one embodiment, the second transmitter 1401 transmits a third signaling; the third signaling indicates that the first time-frequency resource pool is associated with the third time-frequency resource set.

In one embodiment, the first information set adopts different transmission methods respectively in the second time-frequency resource set and the third time-frequency resource set.

In one embodiment, the first time-frequency resource pool comprises K1 first-type time-frequency resource sets, the first time-frequency resource set is one of the K1 first-type time-frequency resource sets, and a location of the first time-frequency resource set in the first-type time-frequency resource set is used to determine whether the third time-frequency resource set carries the first information set.

In one embodiment, the first time-frequency resource pool comprises K1 first-type time-frequency resource sets, the first time-frequency resource set is one of the K1 first-type time-frequency resource sets, and the first information set is associated with the K1 first-type time-frequency resource sets; the first signaling comprises a third field, a transmitter of the first signaling occupies K2 first-type time-frequency resource set(s) in the K1 first-type time-frequency resource sets for a transmission to the first node, and the third field is used to indicate a location of the first time-frequency resource set in the K2 first-type time-frequency resource set(s); K2 is a positive integer not greater than K1.

In one embodiment, the second receiver 1402 performs monitoring in K3 first-type time-frequency resource set(s); the first time-frequency resource pool comprises K1 first-type time-frequency resource sets, any of the K3 first-type time-frequency resource set(s) belongs to the first time-frequency resource pool and is located before the first time-frequency resource set in time domain, and a result of the monitoring is used to determine whether the first field indicates that the target time-frequency resource set is the third time-frequency resource set; K3 is a positive integer less than K1.

In one embodiment, the second transmitter 1401 comprises at least first four of the antenna 420, the transmitter 418, the multi-antenna transmitting processor 471, the transmitting processor 416 and the controller/processor 475 in embodiment 4.

In one embodiment, the second receiver 1402 comprises at least the first four of the antenna 420, the receiver 418, the multi-antenna receiving processor 472, the receiving processor 470 and the controller/processor 475 in embodiment 4.

Embodiment 15

Figure 15:
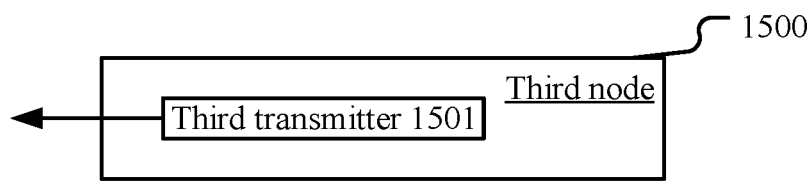
FIG. 15 illustrates a structure block diagram in a third node according to one embodiment of the present disclosure.

Embodiment 15 illustrates a structure block diagram of a third node, as shown in FIG. 15. In FIG. 15, a third node 1500 comprises a third transmitter 1501.

The third transmitter 1501 transmits a second signaling;

In embodiment 15, a first field in a first signaling reuses a field in an SCI format supported by a legal terminal for indicating whether a HARQ-ACK for a first signal is used; the second signaling indicates that the field in the first signaling is reinterpreted as: when the first field in the first signaling indicates that a HARQ-ACK for the first signal is used, a target time-frequency resource set is a second time-frequency resource set, and when the first field in the first signaling indicates that a HARQ-ACK for the first signal is not used, a target time-frequency resource set is a third time-frequency resource set; a receiver of the second signaling comprises a first node, the first node receives the first signaling, receives a first signal in a first time-frequency resource set, and transmits a first information set in the target time-frequency resource set; the first time-frequency resource set belongs to a first time-frequency resource pool; the first signaling comprises the first field, the target time-frequency resource set is one of the second time-frequency resource set and the third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

In one embodiment, the target time-frequency resource set is unrelated to a number of bit block(s) detected by the first node in the first time-frequency resource pool, and the bit block comprises information bits and cyclic redundancy check bits.

In one embodiment, the first field in the first signaling reuses a field in an SCI format supported by a legal terminal for indicating HARQ feedback selection 1 or HARQ feedback selection 2, the HARQ feedback selection 1 is to only feed back a NACK, and the HARQ feedback selection 2 is to feed back both an ACK and a NACK.

In one embodiment, the third transmitter 1501 transmits a third signaling; the third signaling indicates that the first time-frequency resource pool is associated with the third time-frequency resource set.

In one embodiment, the first information set adopts different transmission methods respectively in the second time-frequency resource set and the third time-frequency resource set.

In one embodiment, the first time-frequency resource pool comprises K1 first-type time-frequency resource sets, the first time-frequency resource set is one of the K1 first-type time-frequency resource sets, and a location of the first time-frequency resource set in the first-type time-frequency resource set is used to determine whether the third time-frequency resource set carries the first information set.

In one embodiment, the first time-frequency resource pool comprises K1 first-type time-frequency resource sets, the first time-frequency resource set is one of the K1 first-type time-frequency resource sets, and the first information set is associated with the K1 first-type time-frequency resource sets; the first signaling comprises a third field, a transmitter of the first signaling occupies K2 first-type time-frequency resource set(s) in the K1 first-type time-frequency resource sets for a transmission to the first node, and the third field is used to indicate a location of the first time-frequency resource set in the K2 first-type time-frequency resource set(s); K2 is a positive integer not greater than K1.

In one embodiment, the third transmitter 1501 comprises at least first four of the antenna 420, the transmitter 418, the multi-antenna transmitting processor 471, the transmitting processor 416 and the controller/processor 475 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node and the second node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The base station in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations, RSUs and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling, receiving a first signal in a first time-frequency resource set, the first time-frequency resource set belonging to a first time-frequency resource pool; and
a first transmitter, transmitting a first information set in a target time-frequency resource set;
wherein the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling; the target time-frequency resource set is unrelated to a number of bit block(s) detected by the first node in the first time-frequency resource pool, and the bit block comprises information bits and cyclic redundancy check bits.

2. The first node according to claim 1, wherein the first field in the first signaling reuses a field in an SCI (Sidelink Control Information) format supported by a legal terminal for indicating HARQ (Hybrid Automatic Repeat reQuest) feedback selection 1 or HARQ feedback selection 2, the HARQ feedback selection 1 is to only feed back a NACK, and the HARQ feedback selection 2 is to feed back both an ACK (Acknowledgement) and a NACK (Negative Acknowledgment).

3. The first node according to claim 1, wherein the first receiver receives a second signaling; the first field in the first signaling reuses a field in an SCI (Sidelink Control Information) format supported by a legal terminal for indicating whether a HARQ-ACK (Hybrid Automatic Repeat request Acknowledgment) for the first signal is used; the second signaling indicates that the field in the first signaling is reinterpreted as: when the first field in the first signaling indicates that a HARQ-ACK for the first signal is used, the target time-frequency resource set is the second time-frequency resource set, and when the first field in the first signaling indicates that a HARQ-ACK for the first signal is not used, the target time-frequency resource set is the third time-frequency resource set.

4. The first node according to claim 1, wherein the first receiver receives a third signaling; and the third signaling indicates that the first time-frequency resource pool is associated with the third time-frequency resource set.

5. The first node according to claim 1, wherein the first information set adopts different transmission methods respectively in the second time-frequency resource set and the third time-frequency resource set.

6. The first node according to claim 1, wherein the first time-frequency resource pool comprises K1 first-type time-frequency resource sets, the first time-frequency resource set is one of the K1 first-type time-frequency resource sets, and a location of the first time-frequency resource set in the first-type time-frequency resource set is used to determine whether the third time-frequency resource set carries the first information set.

7. The first node according to claim 1, wherein the first time-frequency resource pool comprises K1 first-type time-frequency resource sets, the first time-frequency resource set is one of the K1 first-type time-frequency resource sets, and the first information set is associated with the K1 first-type time-frequency resource sets; the first signaling comprises a third field, a transmitter of the first signaling occupies K2 first-type time-frequency resource set(s) in the K1 first-type time-frequency resource sets for a transmission to the first node, and the third field is used to indicate a location of the first time-frequency resource set in the K2 first-type time-frequency resource set(s); K2 is a positive integer not greater than K1.

8. The first node according to claim 1, wherein the second time-frequency resource set being related to a location of the first time-frequency resource set in the first time-frequency resource pool includes: the second time-frequency resource set is related to a time-domain location of the first time-frequency resource set.

9. The first node according to claim 1, wherein the above phrase of the third time-frequency resource set being unrelated to a location of the first time-frequency resource set in the first time-frequency resource pool includes: when the first field in the first signaling indicates the third time-frequency resource set out of the second time-frequency resource set and the third time-frequency resource set, and for all data from a second node in the first time-frequency resource pool, the first node transmits a corresponding HARQ-ACK (Hybrid Automatic Repeat request Acknowledgment) in the third time-frequency resource set, and the second node is a transmitter of the first signaling.

10. A second node for wireless communications, comprising:
a second transmitter, transmitting a first signaling, transmitting a first signal in a first time-frequency resource set, the first time-frequency resource set belonging to a first time-frequency resource pool; and
a second receiver, receiving a first information set in a target time-frequency resource set;
wherein the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling; the target time-frequency resource set is unrelated to a number of bit block(s) detected by the first node in the first time-frequency resource pool, and the bit block comprises information bits and cyclic redundancy check bits.

11. The second node according to claim 10, wherein the first field in the first signaling reuses a field in an SCI (Sidelink Control Information) format supported by a legal terminal for indicating HARQ (Hybrid Automatic Repeat request) feedback selection 1 or HARQ feedback selection 2, the HARQ feedback selection 1 is to only feed back a NACK (Negative Acknowledgment), and the HARQ feedback selection 2 is to feed back both an ACK (Acknowledgment) and a NACK.

12. The second node according to claim 10, wherein the second transmitter transmits a second signaling; the first field in the first signaling reuses a field in an SCI (Sidelink Control Information) format supported by a legal terminal for indicating whether a HARQ-ACK (Hybrid Automatic Repeat request Acknowledgment) for the first signal is used; the second signaling indicates that the field in the first signaling is reinterpreted as: when the first field in the first signaling indicates that a HARQ-ACK for the first signal is used, the target time-frequency resource set is the second time-frequency resource set, and when the first field in the first signaling indicates that a HARQ-ACK for the first signal is not used, the target time-frequency resource set is the third time-frequency resource set.

13. The second node according to claim 10, wherein the second transmitter transmits a third signaling; and the third signaling indicates that the first time-frequency resource pool is associated with the third time-frequency resource set.

14. The second node according to claim 10, wherein the first information set adopts different transmission methods respectively in the second time-frequency resource set and the third time-frequency resource set.

15. The second node according to claim 10, wherein the first time-frequency resource pool comprises K1 first-type time-frequency resource sets, the first time-frequency resource set is one of the K1 first-type time-frequency resource sets, and a location of the first time-frequency resource set in the first-type time-frequency resource set is used to determine whether the third time-frequency resource set carries the first information set.

16. The second node according to claim 10, wherein the first time-frequency resource pool comprises K1 first-type time-frequency resource sets, the first time-frequency resource set is one of the K1 first-type time-frequency resource sets, and the first information set is associated with the K1 first-type time-frequency resource sets; the first signaling comprises a third field, a transmitter of the first signaling occupies K2 first-type time-frequency resource set(s) in the K1 first-type time-frequency resource sets for a transmission to the first node, and the third field is used to indicate a location of the first time-frequency resource set in the K2 first-type time-frequency resource set(s); K2 is a positive integer not greater than K1.

17. The second node according to claim 10, wherein the third time-frequency resource set being unrelated to a location of the first time-frequency resource set in the first time-frequency resource pool includes: when the first field in the first signaling indicates the third time-frequency resource set out of the second time-frequency resource set and the third time-frequency resource set, and for all data from a second node in the first time-frequency resource pool, a first node transmits a corresponding HARQ-ACK in the third time-frequency resource set, and the first node is a transmitter of the first information set.

18. A method in a first node for wireless communications, comprising:
receiving a first signaling, receiving a first signal in a first time-frequency resource set, the first time-frequency resource set belonging to a first time-frequency resource pool; and
transmitting a first information set in a target time-frequency resource set;
wherein the first signaling comprises a first field, the target time-frequency resource set is one of a second time-frequency resource set and a third time-frequency resource set, and the first field in the first signaling is used to indicate the target time-frequency resource set out of the second time-frequency resource set and the third time-frequency resource set; the first information set is used to indicate whether the first signal is correctly received; the second time-frequency resource set is related to a location of the first time-frequency resource set in the first time-frequency resource pool, and the third time-frequency resource set is unrelated to a location of the first time-frequency resource set in the first time-frequency resource pool; the first signaling is a physical-layer signaling.

* * * * *